United States Patent [19]

Pauluis

[11] 4,074,974
[45] Feb. 21, 1978

[54] DUAL TEMPERATURE ISOTOPE EXCHANGE APPARATUS USING HOT FEED WITH LIQUID RECYCLE FROM THE HUMIDIFIER

[75] Inventor: Gerard J. C. A. Pauluis, Brussels, Belgium

[73] Assignee: Atomic Energy of Canada Limited, Ottawa, Canada

[21] Appl. No.: 667,725

[22] Filed: Mar. 17, 1976

[30] Foreign Application Priority Data

Mar. 21, 1975 Canada .................................. 222776

[51] Int. Cl.² .......................... B01D 59/33; C01B 5/02
[52] U.S. Cl. ............................. 23/270 R; 23/270.5 W; 423/563; 423/580; 252/301.1 R
[58] Field of Search ......... 23/270.5 W, 270 R, 267 R; 423/580, 563; 252/301.1 R

[56] References Cited

U.S. PATENT DOCUMENTS

| 3,028,222 | 4/1962 | Eriksson | 423/580 H |
| 3,142,540 | 7/1964 | Spevack | 23/270.5 W |
| 3,983,226 | 9/1976 | Nazzer et al. | 23/270.5 W X |
| 4,015,944 | 4/1977 | Pauluis et al. | 423/580 X |

Primary Examiner—Norman Yudkoff
Assistant Examiner—Barry I. Hollander
Attorney, Agent, or Firm—James R. Hughes

[57] ABSTRACT

A dual temperature extraction apparatus comprising a hot and cold tower with liquid and gas streams passing in countercurrent deuterium exchange relation therein, the gas being recycled from the top of the cold tower to the bottom of the hot tower, a humidifier section through which the said recycled gas stream and also the liquid stream from the hot tower passes, a dehumidifier between hot and cold tower through which both gas and liquid streams pass, means for heat exchange between humidifier and dehumidifier, means for heating cold inlet feed liquid and feeding it to the system at the top of the dehumidifier section at a point between the liquid outlet of the hot tower and the liquid input to the humidifier, means for recovering heat from a first portion of the liquid stream leaving the humidifier and passing the stream to waste, means for recycling a second portion of the liquid stream leaving the humidifier to the top of the cold tower, said humidifier section comprising a humidifier recycle section and a booster section in series in the gas and liquid streams such that a portion of the recycled gas from the top of the cold tower passes first through the recycle section and the booster section before entering the bottom of the hot tower and a portion of the liquid stream leaving the hot tower passes in reverse order and a separate humidifier section in parallel with the said humidifier recycle section and booster humidifier section with a portion of the said recycled gas and liquid streams passing through the separate humidifier section, and with the said heated input feed being applied to the top of the booster section and the recycle section is connected to the means for heat exchange between humidifier and dehumidifier, and means for taking an output of gas or liquid enriched in deuterium from the system.

2 Claims, 2 Drawing Figures

DUAL TEMPERATURE ISOTOPE EXCHANGE APPARATUS USING HOT FEED WITH LIQUID RECYCLE FROM THE HUMIDIFIER

This invention relates to an improvement in the dual temperature isotope exchange process for concentrating an isotope of an element especially deuterium by its exchange between two substances at two temperatures.

The dual temperature isotope exchange process has been described at length in previous patents (Canadian Patent No. 574,293 to J. S. Spevack, Canadian Patent No. 866,116 to Dale F. Babcock) and also in the open literature. The process can be subdivided into two families, based on the method adopted for feeding fresh liquid into the system, namely the cold feed process and the hot feed process. By far the most common method, the cold feed process, consists in feeding liquid (water in GS (Girdler-sulphide) processes) at natural concentration to the top of the cold tower, where it gets enriched in deuterium by countercurrent exchange with a stream of gas ($H_2S$ in the GS process). At the bottom of this cold tower, the liquid is heated and then fed to the top of a hot tower where it gives back its deuterium to the counter-current flow of gas. A fraction of the liquid stream is taken as product between the cold and the hot tower and fed to a later stage. When a product is taken, the deuterium concentration in the liquid leaving the hot tower decreases below natural concentration, this liquid is then discarded as waste after proper recuperation of its sensible heat (that is its heat content). All existing GS heavy water plants are built in this way.

As the liquid flows down the hot tower there is a point where its concentration is equal to the feed concentration. Canadian Patent No. 866,116 issued Mar. 16, 1971 to Dale F. Babcock discloses that hot feed liquid could be added at or below this point to increase the extraction of the process. This patent is devoted to a process where a fraction of the feed is fed cold to the top of the cold tower and another additional fraction is fed hot somewhere in the hot tower.

It is known that recycling the liquid stream flowing in the sections above the hot feed injection point to the top of the cold tower amounted to a continuous purification by distillation. It is also shown in the earlier work, that productivity (relative to the gas flow) of dual isotope processes could be improved by effecting a dual transfer of both heat and deuterium from the liquid to the gas in a same unit below the hot tower. This is achieved without necessarily having to increase the flow of liquid with respect to the gas in the lower section of the hot tower.

It is an object of this invention to provide a hot feed process, which while keeping the water purity advantages offered by a recycle of liquid, reduces the energy requirements of the process per unit product through a more efficient use of the heat contained in the various streams.

It is another object of this invention to provide a hot feed process which offers a substantial saving in capital cost over previous hot feed processes, at equal production rate, or conversely which offers a substantial increase in production rate at equal capital costs.

These and other objects of the invention are achieved by dual-temperature isotope exchange-process for concentrating an isotope of an element by its exchange between two substances containing said element, one in liquid and one in gas phase, in a system comprising at least one pair of liquid-gas contacting tower sections which are maintained at different temperatures and through which said substances are continuously circulated through said pair of towers in essentially two closed recycles, the liquid being fed to the first tower of the pair at a first concentration of the isotope to be concentrated, enriched in said first tower to above said first concentration by isotope exchange with the countercurrent gas flow, and thereafter being treated for temperature adjustment and fed to the upper portion of the second tower of said pair of towers, depleted in concentration of said isotope by said exchange in the second tower to above said first concentration in the lower portion of said second tower, the gas being circulated in countercurrent relationship with the liquid from the bottom to the top of said second tower, then treated for temperature adjustment and being fed to the bottom of said first tower, a portion of said substances being extracted from the system between said first and said second tower section, wherein the method of achieving essentially a continuous circulation of both gas and liquid in said towers and introducing isotope to be concentrated to the system, comprises feeding said liquid, at a concentration above said first concentration, from the bottom of said second tower to the top of a by-pass tower section in which it exchanges heat and is depleted of said isotope to said first concentration by direct contact with a fraction of said gas leaving said first tower; returning said liquid from the bottom of said by-pass tower section to the top of said first tower after temperature and flow rate adjustments; feeding another stream of liquid substance, at isotope concentration above said first concentration to another feed tower section in parallel arrangement with said by-pass section, in which feed section, said second stream of liquid exchanges heat and is depleted of said isotope below said first concentration by direct contact with another fraction of said gas leaving said first tower, after which feed section said second liquid stream is discharged as waste to the process; mixing said gas streams from said by-pass section and said feed section and feeding them to the bottom of said second tower.

Figure 1:
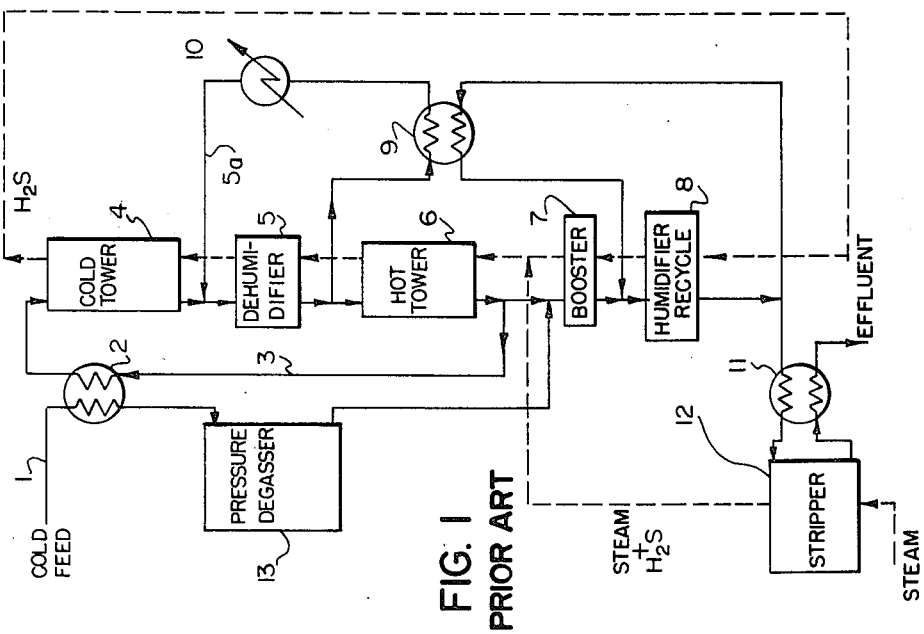
FIG. 1 illustrates a prior art hot feed isotope exchange process.

FIG. 1 is a schematic representation of the hot feed process described in earlier work. The present invention is an improved system of that shown in the earlier work. For clarity, the figures have been reduced to their essential elements, and do not describe auxiliaries such as pumps, valves, blowers etc. It is understood that such auxiliary elements and others are necessary for the operation of a plant but not for the comparison of the processes. In this arrangement the feed liquid 1 exchanges heat in a heat exchanger 2 with a recycle of liquid 3 from the bottom of the hot tower 6 to the top of the cold tower 4. The feed liquid can then be passed through a pressure degasser 13 although this step is not essential. It is then injected above the booster-humidifier section 7. In booster 7 and humidifier recycle 8, it exchanges heat and deuterium with all the countercurrent gas from the top of the cold tower 4. The liquid from the humidifier recycle 8 is split into two portions. Part of it is recycled through the heat exchanger 9, where it recuperates heat from the de-humidifier recycle loop made up of a liquid stream 5a taken from dehumidifier 5 and which also passes through a cooler 10, to the top of humidifier recycle 8, while the remainder passes through the heat exchanger 11, and the stripper 12 which serves to remove any dissolved gas, after which the liquid is discarded to waste.

Because this process uses the plates below the hot tower to achieve both heat and deuterium exchange with the gas coming from the cold tower, it can produce more deuterium per unit gas recycled than earlier processes (hot or cold feed processes) which did not use these plates for deuterium transfer. However, although this process is superior (that is, can produce deuterium cheaper) to prior processes, the extraction in the humidifier recycle section (representing typically 60% of the extraction in the booster section) is limited by the deuterium content in the gas coming from the top of the cold tower and the temperature at the bottom of the humidifier recycle section. Also the recycling of liquid 3 from the bottom of the hot tower entails inefficiencies associated with the heat exchanger 2. It also entails the additional capital cost of the exchanger itself.

It has been discovered that the heat recovery of the process could be improved, and the capital costs reduced, if the liquid from above the feed injection point, before being returned to the top of the cold tower, was allowed to exchange its heat directly with part of the recycling gas from the cold tower in a by-pass section, made of a humidifier and possibly surmounted by a small isothermal section. This by-pass section is separated from the feed section, which could be made of a humidifier recycle, booster, and possibly a small isothermal tower section, or any combination of them. As a result of this improved heat recovery, the hot tower can be run hotter (at equal heat supply) than in the prior art hot feed and its production per unit gas flow increased.

Furthermore it has been found that, because the recycled liquid was depleted of some deuterium in the by-pass section, the gas leaving the cold tower after contacting the recycled liquid was also depleted of deuterium. The latter property is used to enhance the deuterium extraction from the feed liquid. By using two sections in parallel, one for stripping the feed liquid of its deuterium and heating the gas, the other one for cooling the recycle liquid and heating the gas, it was found that the additional parameters available, made possible an optimization of the recycled liquid deuterium concentration independently of the effluent deuterium concentration.

These result in a process in which the production of deuterium per unit gas flow, per unit of heat input, and per unit capital investment, is increased over other cold or hot feed processes.

Figure 2:
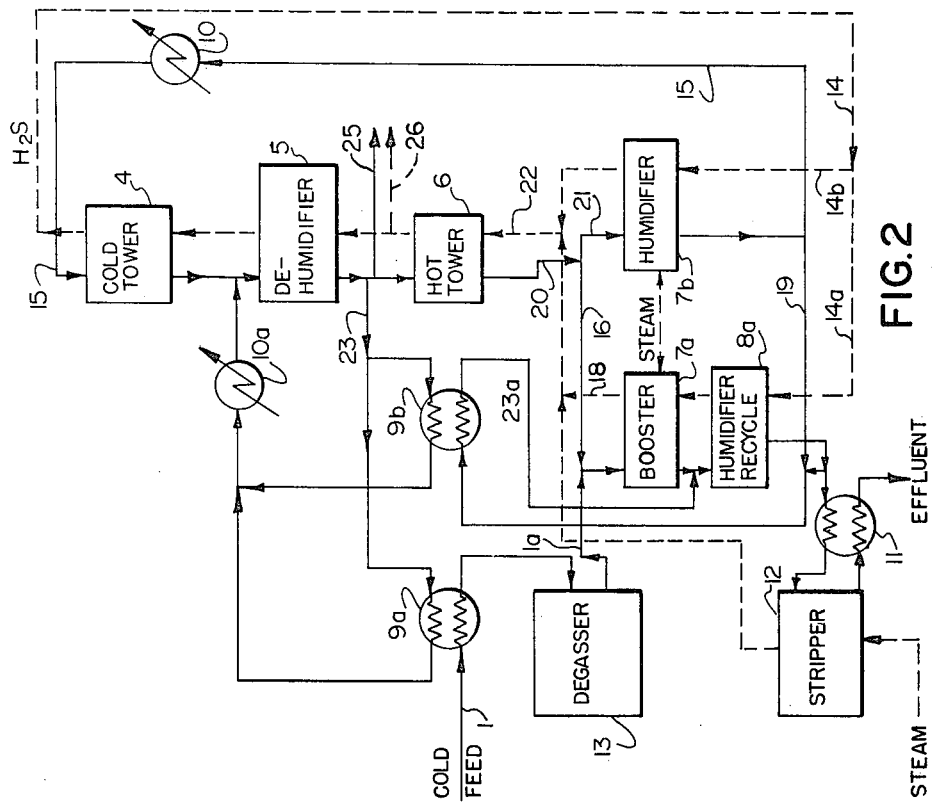
FIG. 2 illustrates a flow diagram according to the present invention.

The process schematic according to the invention is shown in FIG. 2. The feed 1 is heated through part of the dehumidifier/humidifier heat exchanger 9a, it is then fed to a pressure degasser 13 (this step is not essential and from there the liquid (now stream 1a) goes to the top of booster 7a, where it may receive a fraction 16 of main recycle stream. This fraction corresponds to part of the humidity content of the gas stream 18 leaving the booster 7a. (note that the remainder of, or even all, the humidity content of 18 can be returned from the bottom of humidifier 7b via 19 to the humidifier recycle loop, if preferred).

The operation of booster 7a and humidifier recycle 8a is identical to the process described in FIG. 1, except that now all the feed stream exchanges heat and deuterium with only the portion 14a of the gas recycle stream. This feature facilitates the enrichment of the gas. At the bottom of the humidifier-recycle section 8a, the liquid depleted in deuterium is directed through the heat exchanger 11 to the stripper 12 and then discarded as waste. The liquid 20 leaving the hot tower 6, instead of being recycled to the top of the cold tower 4 through a heat exchanger 2 as in FIG. 1, now exchanges directly its heat content with the part 14b of the recycle gas in the by-pass humidifier section 7b. The earlier processes called for the less efficient and more expensive heat transfer via heat exchanger 2 of FIG. 1 and the feed liquid.

As a result of direct gas-liquid contact, the liquid stream 21 exchanges deuterium with the incoming gas stream 14b, thus the liquid recycled to the top of cold tower 4 is at a lower deuterium concentration than the feed stream. The cold tower has to enrich the recycled liquid 15, from a lower isotope content than natural; however, the gas leaving the cold tower, close to equilibrium with this liquid 15 is depleted in the isotope to be concentrated and there is a very strong driving force for its enrichment in the feed section (7a + 8a) and in the by-pass section 7b. Thus better use is made of the humidifier region in a parallel arrangement of a feed section (7a + 8a) and a by-pass section 7b, one can optimize the operation of the lower sections of an exchange stage in a superior way to prior art. It is typical of the process to obtain deuterium concentration of about 135 ppm in the recycled liquid (15) and of about 120 ppm in the effluent, for a feed flow equal to the feed flow of a cold feed process and a feed concentration of 148 ppm.

Because the total flow of gas being heated and enriched in the lower sections (7a + 8a) and 7b of the stage is not basically different of the total flow warmed up in earlier processes (for the same gas recycle flow rate), the sum of the cross section of (7a + 8a) and 7b can be made the same as the cross section of humidifier 8 in the earlier process. It will be understood that the two sections in parallel may be combined, if desired, inside the same pressure envelope, which may also be the envelope containing the hot tower.

Steam may be injected into the feed section only, or injected into feed and by-pass section. If indirect heating is chosen one can heat the feed stream 1a, the humidifier recycle steam 23a or stream 21, or a combination of them. The input feed flow of this process is no longer a direct function of the gas recirculation rate as in cold feed processes. The feed flow rate can thus be made smaller or larger than the recirculating liquid flow rate line 15, depending on economic considerations. The largest practical value will be the one for which the feed rate is equal to all the dehumidifier recycle flow 23, in that case the gas fraction 14a is heated by the feed in a large booster without need for liquid recycle and the humidifier recycle section disappears. The smallest practical value will be zero, corresponding in this case to operation in total recycle. This operation is possible in a plant for some period of time, when the stage still delivers enriched product taken up from its inventory of deuterium. It is a recommended mode of operation when feed has to be halted for short periods of time, and the deuterium profile established in the towers is to be conserved. Table 1 shows a typical comparison of the production of an established prior art cold feed process and the present process, both processes operating with the same heat supply at about 144° C hot tower temperature:

TABLE 1
COMPARISON OF PRIOR ART PROCESS AND PREFERRED PROCESS

| Process family | Prior art cold feed process | Present system |
|---|---|---|
| | cold feed, effluent from bottom humidifier | hot feed, effluent from bottom humidifier |
| Production (mol/s) | .2566 | .2713 |
| Bottom cold tower concentration (ppm) | 1578 | 1578 |
| Number of plates: total* | 160 | 160 |
| cold tower | 67 | 67 |
| dehumidifier | 13 | 13 |
| hot tower | 67 | 61 |
| booster | | 8 |
| by-pass | | 19 |
| humid recycle | 13 | 11 |
| Steam flow (kmol/s)** | 1.943 | 1.943 |
| Gas flow to cold tower (kmol/s) | 16.838 | 16.785 |
| liquid flow from cold tower (kmol/s) | 8.248 | 8.154 |
| Temperature, gas to cold tower (° C) | 32° C | 32° C |
| Temperature, gas to hot tower (° C) | 143.9° C | 145.1° C |
| Gas flow to by-pass (kmol/s) | | 4.384 |
| Liquid recycle concentration (ppm) | | 134.4 |
| Liquid from humid recycle conc (ppm) | 121.6 | 119.9 |
| Heat exchange surfaces: (m²) | | |
| unit 9 (9a 9b) | 15515 | 8378  7137 |
| 11 | 12356 | 12356 |
| feed preheater*** | | 1500 |
| Feed flow (kmol/s) | 8.017 | 8.053 |

*Only the total number of plates stacked on top of each other is taken into account, this number then is a measure of the tower volume.
**All the steam is fed into the booster, 6 plates below the top, in the preferred process. All the steam is fed to the bottom of the hot tower in the prior art.
***Capital cost of this preheater partly recuperated from cooling requirements, as the total heat supply, thus the losses, is constant.

Table II shows another comparison between the two processes, for conditions closely approaching the proposed Gentilly Heavy Water Plant. The comparions are made using the same simulation model as is now utilized as reference to monitor operation and design of heavy water plants.

Table II
Comparison of Prior art and Preferred process

| Process Family | Prior Art Cold Feed System | Present System |
|---|---|---|
| | Cold feed, effluent from bottom humidifier | hot feed, effluent from bottom humidifier |
| Production (mol/s) | .21732 | .23133 |
| Bottom Cold tower concentration (ppm) | 1578. | 1578. |
| Number of plates: total* | 164. | 164. |
| cold tower | 68 | 68 |
| dehumidifier | 14 | 14 |
| hot tower | 66 | 62 |
| booster | | 7 |
| by-pass | | 20 |
| humid recycle | 16 | 13 |
| Steam flow (kmol/s)** | 1.239 | 1.239 |
| Gas flow to cold tower (kmol/s) | 16.836 | 16.767 |
| Liquid Flow from cold tower (kmol/s) | 8.186 | 8.136 |
| Temperature, gas to cold tower (° C) | 32° C | 32° C |
| Temperature, gas to hot tower (° C) | 125.8 | 127.16 |
| Gas Flow to by-pass (kmol/s) | | 5.68 |
| Liquid recycle concentration (ppm) | | 133.3 |
| Liquid from humid recycle conc (ppm) | 123.3 | 121.7 |
| Heat Exchange surfaces (m²) | | |
| unit 9 (9a 9b) | 8516. | 3575.  4941 |
| unit 11 | 9290. | 9290 |
| feed preheater*** | | 1000. |
| Feed flow (kmol/s) | 7.957 | 8,053 |

*Only the total number of plates stacked on top of each other is taken into account, this number then is a measure of the tower volume.
**All the steam is fed into the booster 5 plates below the top, in the preferred process. All the steam is fed to the bottom of the hot tower in the prior art.
cost of this preheater partly recuperated from cooling requirements, as the total heat supply, thus the losses, is constant.

Table 1 and II clearly shows improvements of about 5.7 to 6.5% in the same conditions of heat supply, flow rates and capital costs. It is likely however that the increased purity of the recycled liquid stream, compared to a cold feed process, will result in another major increase in production, the latter however cannot be quantified.

The key elements of the present process are:
1. The splitting of the lower part of the first stage, (made up in the earlier process of booster (7) and humidifier recycle section (8)) into two sections in parallel arrangement respectively (7a + 8a) and (7b);
2. the splitting of the recycled gas from the top of the cold tower in two fractions 14a and 14b, fed to the sections mentioned in 1), and the junction of these fractions above the feed injection point at the bottom of the hot enriching section (6);
3. the recycling of liquid in the main recycle loop (that is the liquid flow down the cold tower (4), dehumidifier (5), hot tower (6), humidifier (7b) and recycled through (15) to (4)) via the by-pass section (7b) where it exchanges deuterium and heat by direct contact with a fraction (14b) of the countercurrent recycling gas (14), hence isolating the recycled liquid from any direct liquid phase addition of matter from the feed stream (2);
4. the contacting of hot feed liquid in the tower section (7a 8a) with the remaining fraction of the gas recycle stream (14a). An output of gas or liquid or both enriched in deuterium may be taken from the apparatus from a location between the cold and the hot towers e.g. positions 25 or 26 in FIG. 2.

I claim:

1. A dual temperature deuterium extraction apparatus comprising:
   a. a hot and cold tower with liquid water and hydrogen sulphide gas streams passing in countercurrent deuterium exchange relation therein;
   b. a dehumidifier between hot and cold towers through which gas from the hot tower passes to the cold tower and liquid from the cold tower passes to the hot tower,
   c. a by-pass humidifier section,
   d. a humidifier recycle section,
   e. a booster humidifier section,
   f. means for taking gas from the cold tower and passing a portion through the by-pass humidifier to the hot tower and the remaining portion through the humidifier recycle section and the booster humidifier section in series to the hot tower,
   g. means for taking a liquid output from the hot tower and passing a portion through the by-pass humidifier and the remaining portion through the booster humidifier section and the humidifier recycle section in series,
   h. a gas stripper having a steam injection inlet,
   i. means for taking the liquid output from the humidifier recycle section and passing it through the said stripper via a first heat exchanger and out of the system as effluent,
   j. means for taking gas from the stripper and passing the gas to the hot tower,
   k. means for taking a cold liquid input feed, passing it through a second heat exchanger and injecting it into the top of the booster humidifier section,
   l. means for taking a portion of the liquid leaving the de-humidifier and passing a portion of this through the said second heat exchanger to heat the cold liquid feed and the remaining portion through a third heat exchanger and returning both portions to the liquid input of the dehumidifier, m. means for taking a liquid output from the by-pass humidifier section, recycling a portion to the top of the cold tower and passing the remaining portion through the said third heat exchanger and back to the top of the humidifier recycle section, n. means for taking an output of gas or liquid or both enriched in deuterium from a location in the apparatus between the cold and hot towers.

2. A dual temperature deuterium extraction apparatus as in claim 1 further comprising a pressure degasser through which the cold liquid feed is passed before injection into the booster humidifier section.

* * * * *